US012626186B2

(12) United States Patent
Blum et al.

(10) Patent No.: US 12,626,186 B2
(45) Date of Patent: May 12, 2026

(54) AUTOMATED MACHINE LEARNING FOR NETWORK-BASED DATABASE SYSTEMS

(71) Applicant: Snowflake Inc., Bozeman, MT (US)

(72) Inventors: Rachel Frances Blum, South Orange, NJ (US); Nancy Dou, Salem, NH (US); Matthew J. Glickman, Larchmont, NY (US); Boxin Jiang, Sunnyvale, CA (US); Orestis Kostakis, Redmond, WA (US); Justin Langseth, Kailua, HI (US); Michael Earle Rainey, Kennewick, WA (US); Haoran Yu, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 933 days.

(21) Appl. No.: 17/821,587

(22) Filed: Aug. 23, 2022

(65) Prior Publication Data

US 2024/0062098 A1 Feb. 22, 2024

Related U.S. Application Data

(60) Provisional application No. 63/371,583, filed on Aug. 16, 2022.

(51) Int. Cl.
G06N 20/00 (2019.01)

(52) U.S. Cl.
CPC .................................... G06N 20/00 (2019.01)

(58) Field of Classification Search
CPC .................................................... G06N 20/00
See application file for complete search history.

(56) References Cited

U.S. PATENT DOCUMENTS

| | | | |
|---|---|---|---|
| 11,216,580 B1 * | 1/2022 | Holboke | ............. G06F 21/6245 |
| 11,227,187 B1 * | 1/2022 | Weinberger | .............. G06N 3/08 |
| 11,538,048 B1 * | 12/2022 | Nahta | ................... G06N 3/0985 |
| 11,610,115 B2 * | 3/2023 | Kar | ......................... G06V 10/82 |
| 11,651,287 B1 * | 5/2023 | Kostakis | ................... G06F 8/61 |
| | | | 706/12 |
| 11,734,614 B1 * | 8/2023 | Wang | ................... G06Q 30/016 |
| | | | 706/12 |
| 11,741,698 B2 * | 8/2023 | Rosman | ................. G06V 10/96 |
| 11,922,328 B1 * | 3/2024 | Gdak | ..................... G06N 5/022 |
| 11,989,626 B2 * | 5/2024 | Arnold | .................. G06F 17/18 |
| 11,989,627 B1 * | 5/2024 | Bhise | .................. G06F 18/2113 |

(Continued)

*Primary Examiner* — David E Choi

(74) *Attorney, Agent, or Firm* — Schwegman Lundberg & Woessner, P.A.

(57) ABSTRACT

The subject technology receives first party training data provided by an end-user of a baseline machine learning model. The subject technology determines a first set of common features based on the first party training data. The subject technology receives, from at least one data source. The subject technology determines a second set of common features based on the set of datasets. The subject technology trains, using the first set of common features and the second set of common features, a second machine learning model, the second machine learning model incorporating additional training data from the external data supplier during training compared to the baseline machine learning model. The subject technology generates a boosted machine learning model based at least in part on the training, the boosted machine learning model comprising the trained second machine learning model.

14 Claims, 8 Drawing Sheets

(56)                         References Cited

U.S. PATENT DOCUMENTS

| | | | | |
|---|---|---|---|---|
| 12,131,394 | B1 * | 10/2024 | Pokkunuri | G06N 20/00 |
| 12,158,874 | B2 * | 12/2024 | Borchmann | G06F 16/211 |
| 12,242,469 | B2 * | 3/2025 | Datt | G06N 3/0985 |
| 12,361,093 | B2 * | 7/2025 | Ambati | G06N 20/00 |
| 2018/0137525 | A1 * | 5/2018 | Cotton | G06N 5/04 |
| 2019/0138946 | A1 * | 5/2019 | Asher | G06N 5/04 |
| 2020/0349468 | A1 * | 11/2020 | Arya | G06F 18/214 |
| 2021/0073669 | A1 * | 3/2021 | Banerjee | G06N 3/045 |
| 2021/0073675 | A1 * | 3/2021 | Ribera Prat | G06F 17/18 |
| 2021/0166308 | A1 * | 6/2021 | Carmichael | G06Q 40/03 |
| 2021/0241131 | A1 * | 8/2021 | Khawas | G06N 5/04 |
| 2022/0044078 | A1 * | 2/2022 | Sathe | G06N 20/00 |
| 2022/0129781 | A1 * | 4/2022 | Cogan | G06N 20/00 |
| 2023/0029697 | A1 * | 2/2023 | Kruk | G06N 20/00 |
| 2023/0289276 | A1 * | 9/2023 | Kozhaya | G06F 11/3447 |
| 2023/0306003 | A1 * | 9/2023 | Jain | G06F 16/254 |
| 2023/0367818 | A1 * | 11/2023 | Han | G06N 20/00 |
| 2023/0385687 | A1 * | 11/2023 | Mahmood | G06F 18/2193 |
| 2024/0086762 | A1 * | 3/2024 | Deosthali | G06N 20/00 |
| 2024/0095579 | A1 * | 3/2024 | Paulraj | G06F 21/6245 |
| 2024/0104423 | A1 * | 3/2024 | Sodhi | G06F 18/285 |
| 2024/0160997 | A1 * | 5/2024 | Hertzberg | G06N 20/20 |
| 2024/0161525 | A1 * | 5/2024 | Maiman | G06F 40/40 |
| 2024/0211795 | A1 * | 6/2024 | Edakunni | G06N 20/00 |
| 2025/0077949 | A1 * | 3/2025 | Ponnalagu | G06N 20/00 |

* cited by examiner

500

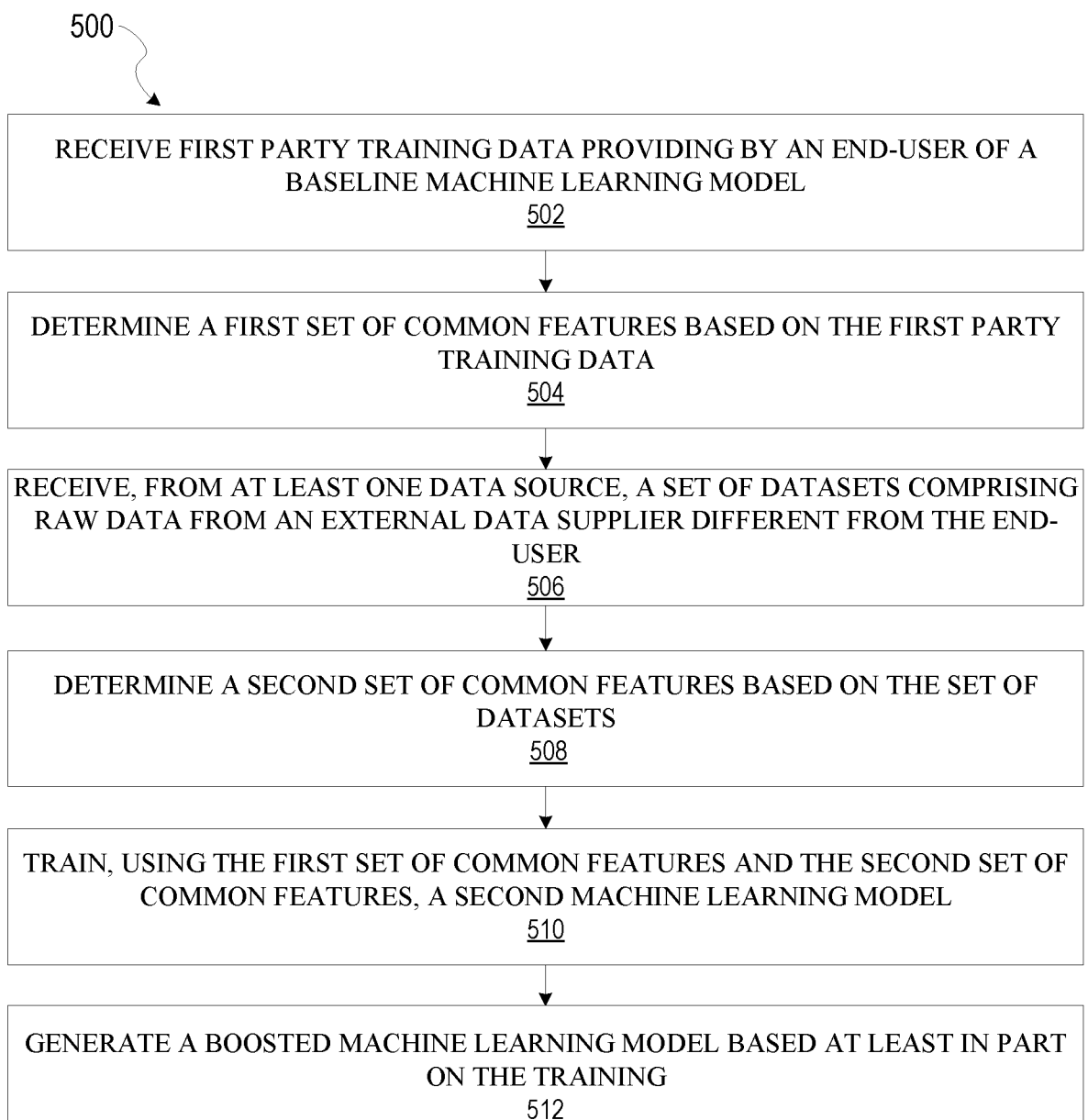

RECEIVE FIRST PARTY TRAINING DATA PROVIDING BY AN END-USER OF A
BASELINE MACHINE LEARNING MODEL
502

DETERMINE A FIRST SET OF COMMON FEATURES BASED ON THE FIRST PARTY
TRAINING DATA
504

RECEIVE, FROM AT LEAST ONE DATA SOURCE, A SET OF DATASETS COMPRISING
RAW DATA FROM AN EXTERNAL DATA SUPPLIER DIFFERENT FROM THE END-
USER
506

DETERMINE A SECOND SET OF COMMON FEATURES BASED ON THE SET OF
DATASETS
508

TRAIN, USING THE FIRST SET OF COMMON FEATURES AND THE SECOND SET OF
COMMON FEATURES, A SECOND MACHINE LEARNING MODEL
510

GENERATE A BOOSTED MACHINE LEARNING MODEL BASED AT LEAST IN PART
ON THE TRAINING
512

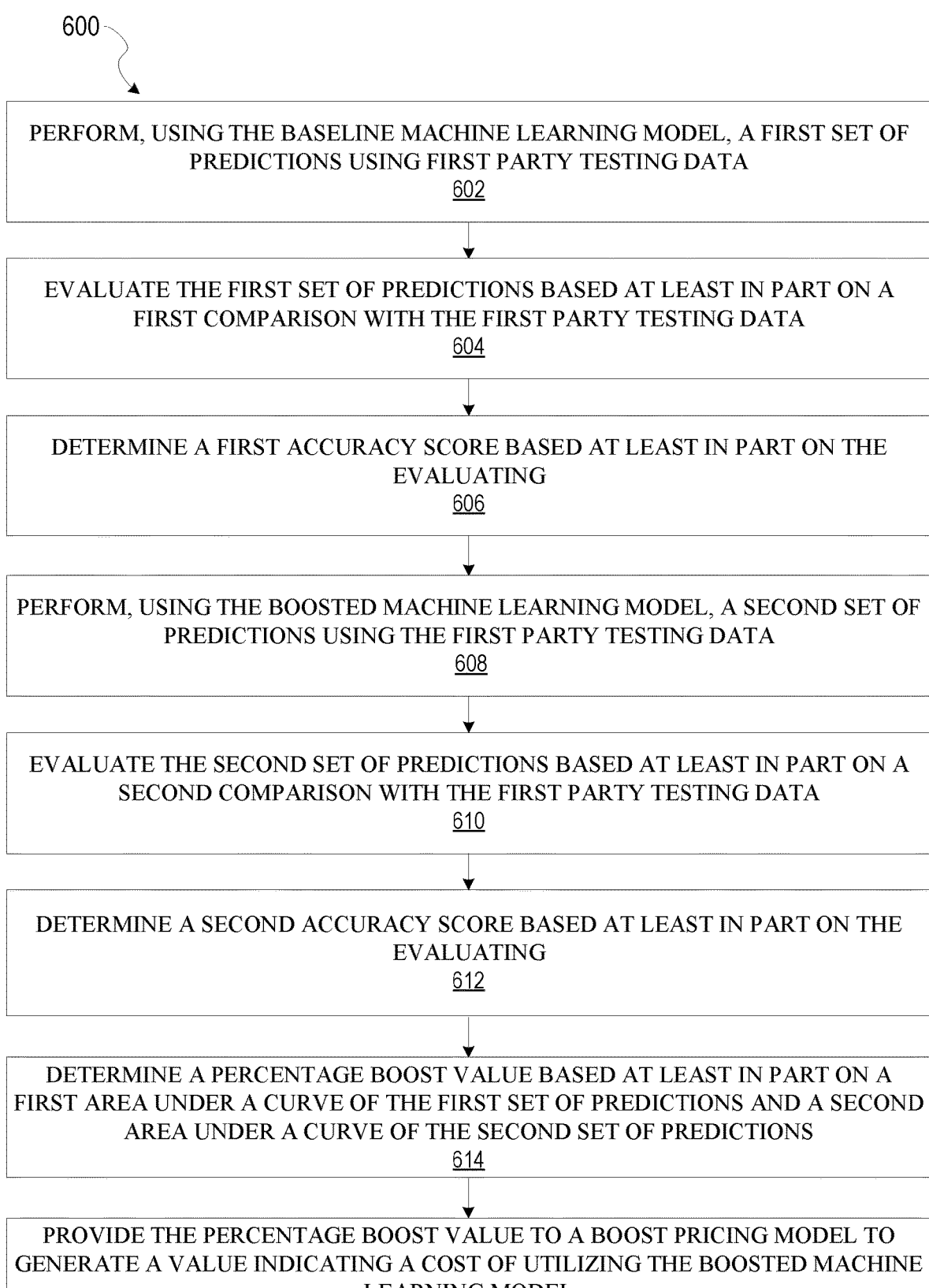

PERFORM, USING THE BASELINE MACHINE LEARNING MODEL, A FIRST SET OF PREDICTIONS USING FIRST PARTY TESTING DATA
602

EVALUATE THE FIRST SET OF PREDICTIONS BASED AT LEAST IN PART ON A FIRST COMPARISON WITH THE FIRST PARTY TESTING DATA
604

DETERMINE A FIRST ACCURACY SCORE BASED AT LEAST IN PART ON THE EVALUATING
606

PERFORM, USING THE BOOSTED MACHINE LEARNING MODEL, A SECOND SET OF PREDICTIONS USING THE FIRST PARTY TESTING DATA
608

EVALUATE THE SECOND SET OF PREDICTIONS BASED AT LEAST IN PART ON A SECOND COMPARISON WITH THE FIRST PARTY TESTING DATA
610

DETERMINE A SECOND ACCURACY SCORE BASED AT LEAST IN PART ON THE EVALUATING
612

DETERMINE A PERCENTAGE BOOST VALUE BASED AT LEAST IN PART ON A FIRST AREA UNDER A CURVE OF THE FIRST SET OF PREDICTIONS AND A SECOND AREA UNDER A CURVE OF THE SECOND SET OF PREDICTIONS
614

PROVIDE THE PERCENTAGE BOOST VALUE TO A BOOST PRICING MODEL TO GENERATE A VALUE INDICATING A COST OF UTILIZING THE BOOSTED MACHINE LEARNING MODEL
616

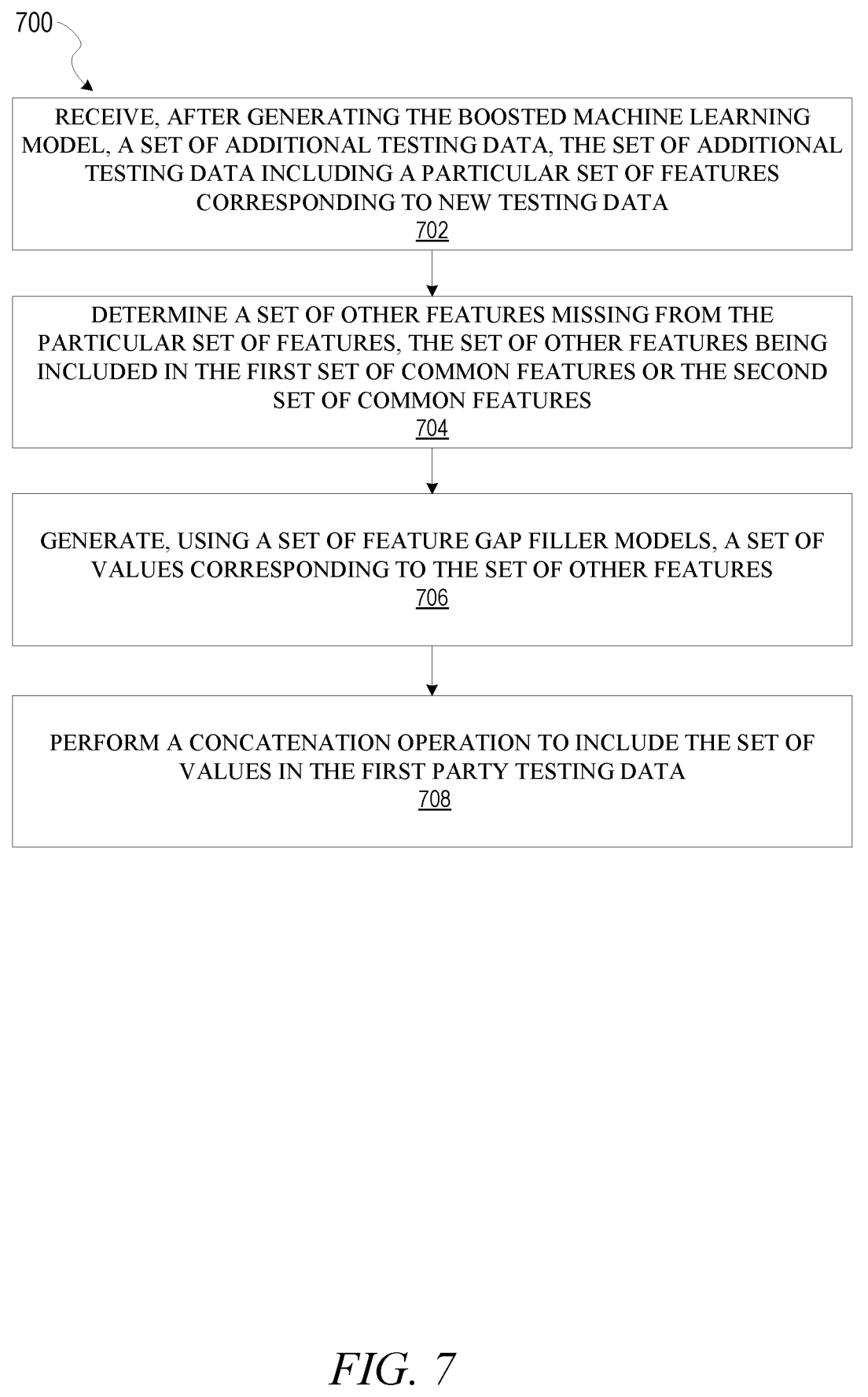

RECEIVE, AFTER GENERATING THE BOOSTED MACHINE LEARNING MODEL, A SET OF ADDITIONAL TESTING DATA, THE SET OF ADDITIONAL TESTING DATA INCLUDING A PARTICULAR SET OF FEATURES CORRESPONDING TO NEW TESTING DATA
702

DETERMINE A SET OF OTHER FEATURES MISSING FROM THE PARTICULAR SET OF FEATURES, THE SET OF OTHER FEATURES BEING INCLUDED IN THE FIRST SET OF COMMON FEATURES OR THE SECOND SET OF COMMON FEATURES
704

GENERATE, USING A SET OF FEATURE GAP FILLER MODELS, A SET OF VALUES CORRESPONDING TO THE SET OF OTHER FEATURES
706

PERFORM A CONCATENATION OPERATION TO INCLUDE THE SET OF VALUES IN THE FIRST PARTY TESTING DATA
708

*FIG. 7*

AUTOMATED MACHINE LEARNING FOR NETWORK-BASED DATABASE SYSTEMS

CROSS-REFERENCE TO RELATED APPLICATIONS

This application claims priority to U.S. Provisional Patent Application Ser. No. 63/371,583, filed Aug. 16, 2022, entitled "IMPROVED AUTOMATED MACHINE LEARNING FOR NETWORK-BASED DATABASE SYSTEMS," and the contents of which is incorporated herein by reference in its entirety for all purposes.

TECHNICAL FIELD

Embodiments of the disclosure relate generally to a network-based database system or a cloud data platform.

BACKGROUND

Cloud-based data warehouses and other database systems or data platforms sometimes provide support for transactional processing that enable such systems to perform operations that are not available through the built-in, system-defined functions. However, for mitigating security risks, security mechanisms to ensure that user code running on such systems remain isolated are needed.

Improving the accuracy of machine learning (ML) modeling is a goal of many companies. Existing approaches, however, sometimes lack the utilization of various data sources to achieve such improved accuracy of ML models thereby limiting an amount of improvement.

BRIEF DESCRIPTION OF THE DRAWINGS

The present disclosure will be understood more fully from the detailed description given below and from the accompanying drawings of various embodiments of the disclosure.

FIG. 5 is a flow diagram illustrating operations of a database system or computing environment in performing a method, in accordance with some embodiments of the present disclosure.

FIG. 6 is a flow diagram illustrating operations of a database system or computing environment in performing a method, in accordance with some embodiments of the present disclosure.

FIG. 7 is a flow diagram illustrating operations of a database system or computing environment in performing a method, in accordance with some embodiments of the present disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Embodiments of the subject technology enable improving the accuracy of ML modeling (e.g., increasing signal for more accurate prediction) by securely connecting to datasets made available by various data suppliers in a data cloud.

Moreover, such data suppliers (e.g., customers that have agreed to share data, e.g., data providers with opt-in consent) could be compensated for their participation in securely sharing datasets.

Until now this type of data pooling for cross company-cross dataset analysis at this scale could not be done. Historically to perform cross company data set joins, sets of data would have to be configured, encrypted or anonymized, and moved in and out of databases for joint analysis, requiring a significant amount of engineering with limited impact.

Using approaches described by embodiments herein, the subject system automatically enriches the user's data with existing data from other participating users to produce better ML models. All computations are performed without data being revealed to any other participant. In addition, because the described processes herein are opt-in for suppliers with no required configuration for either supplier or requester, and the processes are fully automated, improved ML results can be achieved with no engineering resources for high impact in an instantaneous manner.

Figure 1:
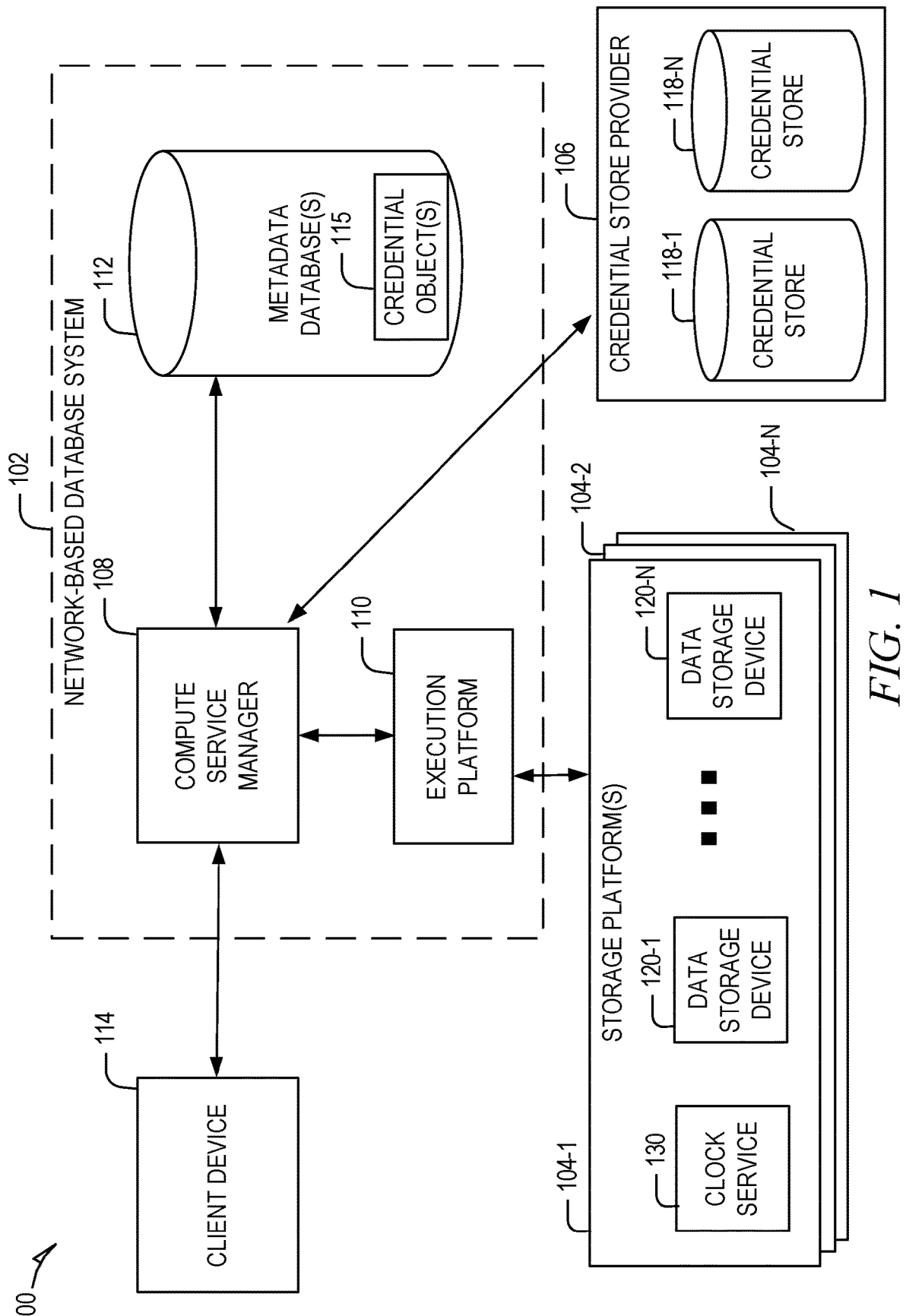
FIG. 1 illustrates an example computing environment that includes a network-based database system in communication with a cloud storage platform, in accordance with some embodiments of the present disclosure.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104-1 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104-1. The cloud storage platform 104-1 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104-1) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one or more security credentials to be retrieved by the compute service manager 108 from one of the remote credential stores 118-1 to 118-N (e.g., for use in accessing data stored by the storage platform 104-1).

The compute service manager 108 is further coupled to the execution platform 110, which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 120-1 to 120-N, and each other storage platform can also include multiple data storage devices. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems or any other data storage technology. Additionally, the storage platform 104 may include distributed file systems (such as Hadoop Distributed File Systems (HDFS)), object storage systems, and the like. Similarly, any of the data storage devices in other storage platforms as discussed further herein can also have similar characteristics described above in connection with storage platform 104-1.

In an embodiment, each storage platform can provide a different domain or type of storage. For example, storage platform 104-1 may provide storage for a database that stores tables using micro-partitions as discussed further herein, and storage platform 104-2 may provide storage for linearizable storage corresponding to a distributed database (e.g., FoundationDB) that stores tables in a key-value format. Thus, in an implementation, different storage platforms can be utilized for cross domain transactions against different types of databases as discussed further below. In another embodiment, the same storage platform can be utilized for such cross domain transactions where different data storage devices (e.g., data storage device 120-1 and data storage device 120-N) can be utilized for a first type of database (database tables based on micro-partitions) and a second type of database (e.g., linearizable storage tables).

As shown in FIG. 1, the data storage devices 120-1 to 120-N are decoupled from the computing resources associated with the execution platform 110. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

As further shown, the storage platform 104-1 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks.

These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104-1, are shown in FIG. 1 as individual discrete components. However, each of the compute service manager 108, metadata database(s) 112, execution platform 110, and storage platform 104-1 may be implemented as a distributed system (e.g., distributed across multiple systems/platforms at multiple geographic locations). Additionally, each of the compute service manager 108, metadata database(s) 112, execution platform 110, and storage platform 104-1 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104-1. It is desirable to retrieve as much data as possible from caches within the execution platform 110 because the retrieval speed is typically much faster than retrieving data from the cloud storage platform 104-1.

In embodiments, the compute service manager 108 is also coupled to one or more metadata databases 112 that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enables the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

As shown in FIG. 1, the computing environment 100 separates the execution platform 110 from the storage platform 104-1. In this arrangement, the processing resources and cache resources in the execution platform 110 operate independently of the data storage devices 120-1 to 120-N in the cloud storage platform 104-1. Thus, the computing resources and cache resources are not restricted to specific data storage devices 120-1 to 120-N. Instead, all computing resources and all cache resources may retrieve data from, and store data to, any of the data storage resources in the cloud storage platform 104-1.

Figure 2:
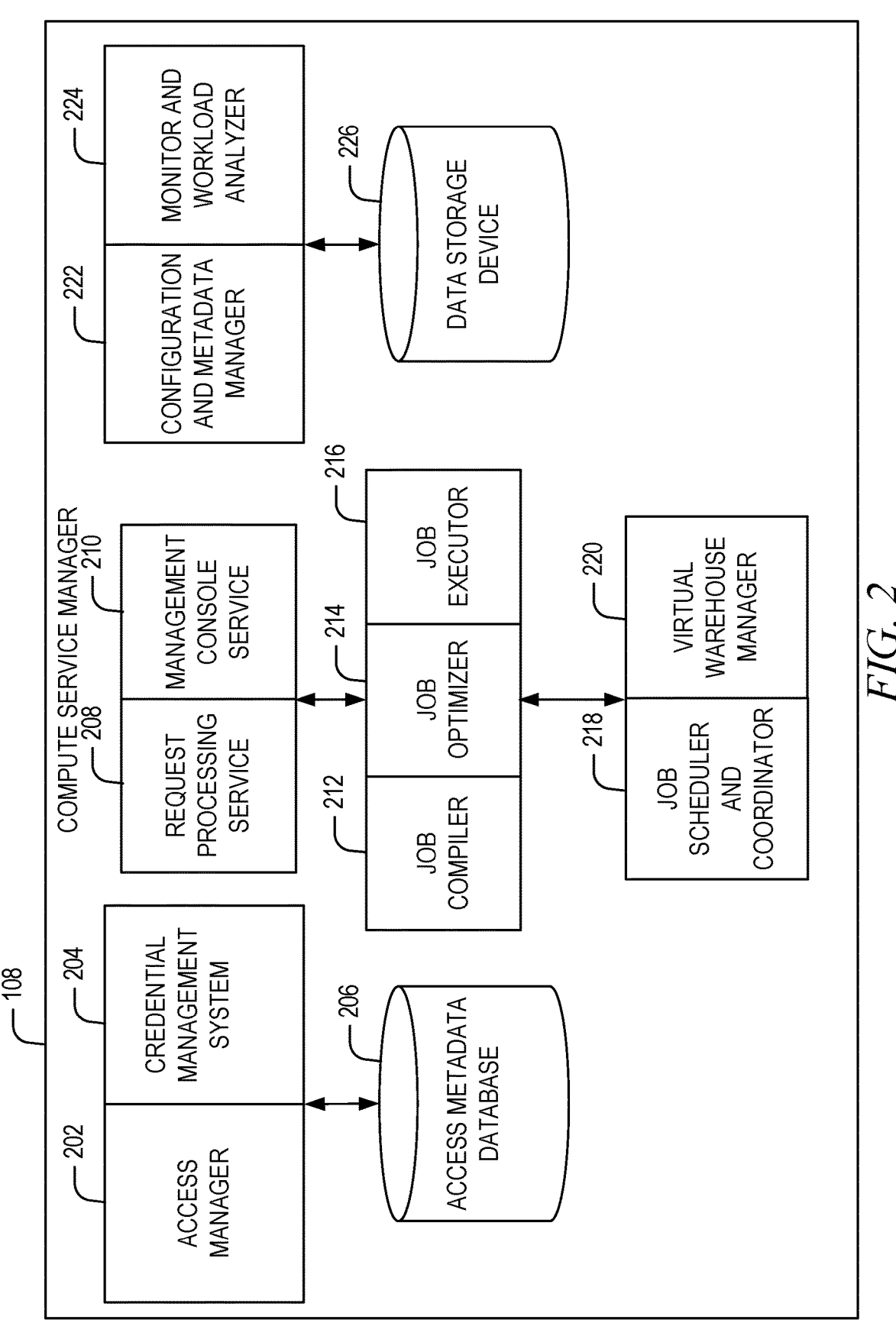
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104-1.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104-1) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104-1, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
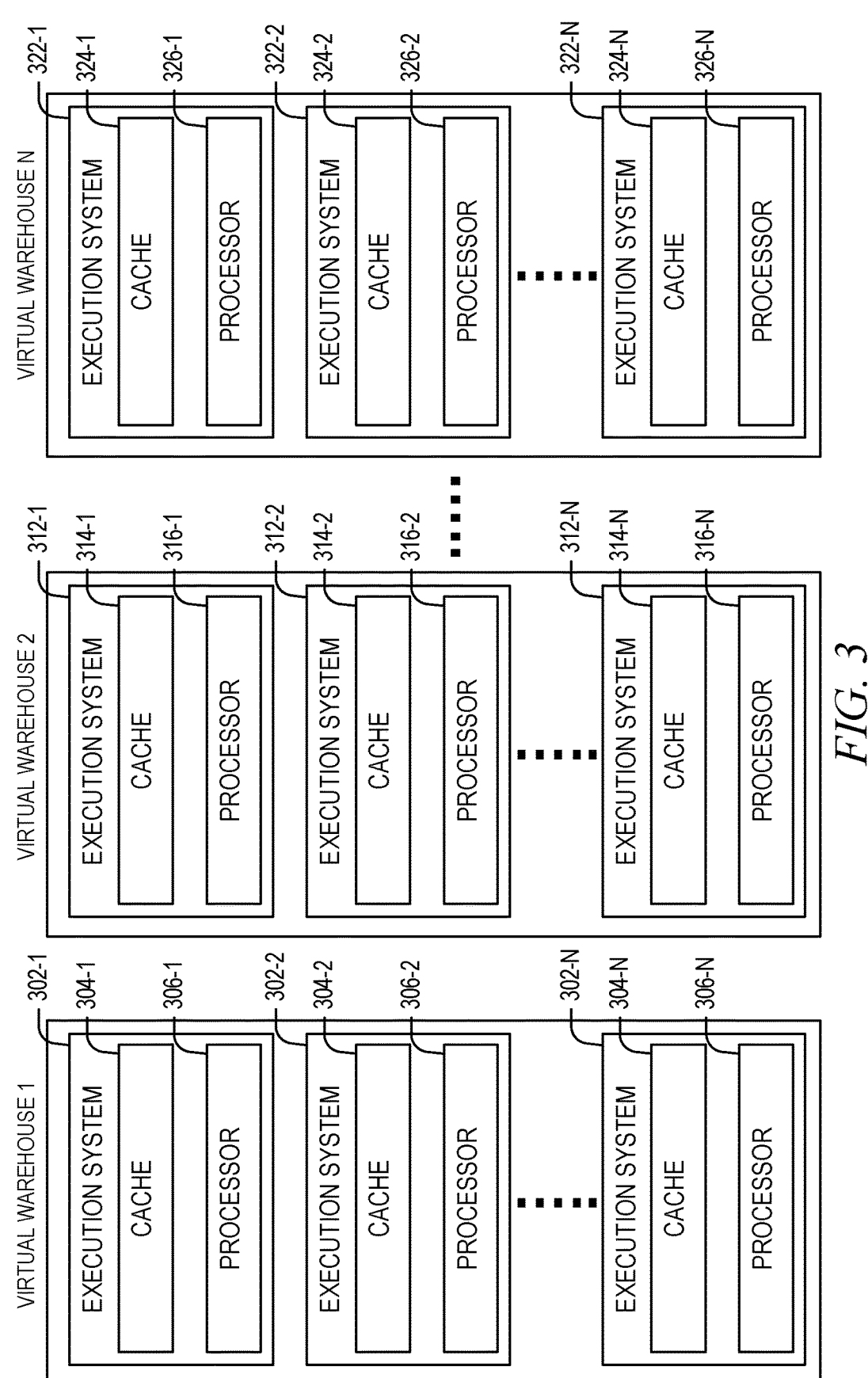
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104-1).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104-1. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104-1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104-1.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104-1, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
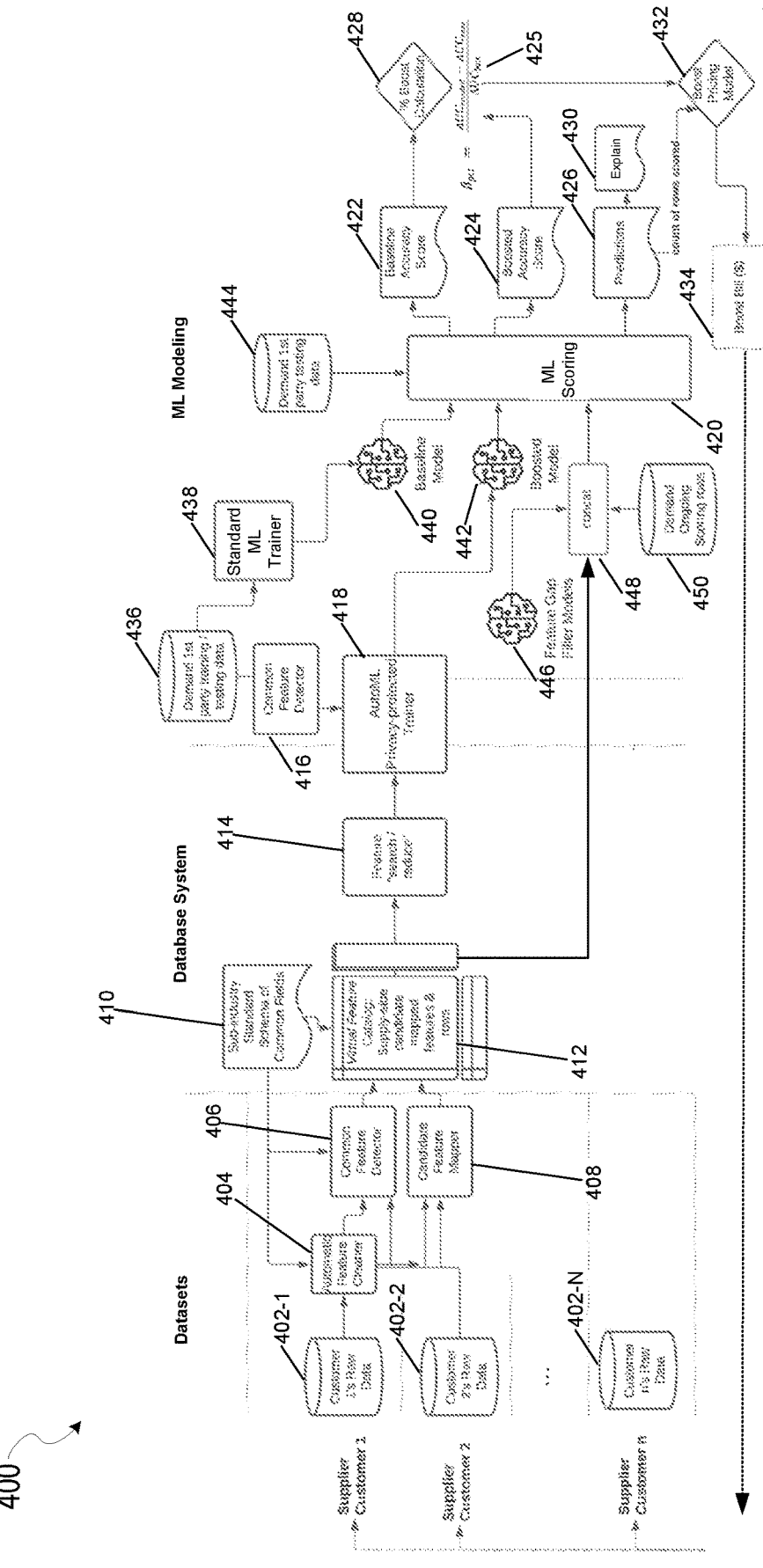
FIG. 4 is a computing environment conceptually illustrating an example software architecture for providing automated machine learning using raw data from various sources, in accordance with some embodiments of the present disclosure.

FIG. 4 is a computing environment 400 conceptually illustrating an example software architecture for providing machine learning modeling on a database system (e.g., the network-based database system 102), which can be performed by components of network-based database system, including compute service manager 108 or a given execution node, in accordance with some embodiments of the present disclosure.

As shown, computing environment 400 includes three portions with various components (e.g., starting on the left-hand side to the right-hand side of FIG. 4) providing functionality involving datasets, a database system (e.g., network-based database system 102), and machine learning (ML) modeling. Each database discussed in FIG. 4 can be provided by a storage platform (e.g., storage platform 104-1, storage platform 104-2, storage platform 104-N). A discussion of the various components is provided in the following.

Datasets (e.g., raw data) can be stored in different databases including database 402-1, database 402-2 up to an N number of databases, e.g., database 402-N. In the example of FIG. 4, database 402-1 stores raw data of customer 1, database 402-2 stores raw data of customer 2, and database 402-N stores raw data of customer N. A customer as included in FIG. 4 can be a particular entity or user of the database system shown in FIG. 4, or a particular entity that has agreed to provide data to a user(s) of the database system or ML modeling.

An automatic feature cleaner 404 receives raw protected data via data clean room privacy such that personal identifiable information (PII) is not shared or exposed to other parties. In an example, data from one or more of database 402-1, database 402-2, or database 402-N is provided in or transferred to a data clean room which is created or provided by the subject system. In an embodiment, automatic feature cleaner 404 performs pre-processing or transformation of the raw protected data into suitable formats for being consumed and utilized by other components of the database system or ML modeling components (discussed further herein).

A data clean room may be implemented using the techniques described in U.S. patent application Ser. No. 16/944, 929, entitled "Data Clean Room," filed on Jul. 31, 2020, which is incorporated herein by reference in its entirety, the incorporation by reference being made with the following exception: In the event that any portion of the above-referenced application is inconsistent with this application, this application supersedes the above-referenced application.

A common feature detector 406 determines common features that are identified across raw data from multiple databases (e.g., based on sub-industry standard schema of common fields 410) where such common features are also being utilized in the ML modeling portion of computing environment 400. In an example, common feature detector 406 detects semantic types based on a classification process.

Classification in the context of detecting common features is a process that analyzes and categorizes information stored in the columns in database tables and views. Once the classification process completes, classification utilizes object tags to label the data, which can then be used to facilitate analysis of training data used by components from the ML modeling portion of computing environment 400.

In an example, the subject system uses two category types for classifying data in table/view columns:

Semantic categories

Privacy categories

In particular, common feature detector 406 determines a semantic category by identifying a column from the raw data as storing personal attributes. In some examples, semantic categories include:

Name

Address

Zip code

Phone number

Age

Gender

IP address

Merchant ID

Credit card number

In an implementation, when a column is determined to have a semantic category, the column can be further classified according to privacy categories including but not limited to:

Identifier: also known as direct identifiers, these attributes uniquely identify an individual (e.g. name, social security number, or phone number).

Quasi-identifier: also known as indirect identifiers, these attributes, when combined with other attributes, can be used to uniquely identify an individual (e.g. age+gender+zip).

Sensitive: personal attributes that are not identifying, but are information that individuals do not want disclosed for privacy reasons (e.g. salary or medical/healthcare status).

Transactions and Spatiotemporal: e.g., ridesharing, credit card transactions, doctor visits It is appreciated that multiple semantic categories from all three privacy categories can be considered "Sensitive Personal Data", "Special Categories of Data", or similar terms under applicable laws and regulations, which can require additional protections or controls.

In an embodiment, common feature detector 406 (or candidate feature mapper 408) determines what data might be joinable to append rows or to append columns based on the semantic categories and the analysis for the training data from the ML modeling portion of computing environment 400.

By way of example, if the ML modeling portion is training ML models for detecting instances of fraud in financial transactions, common feature detector 406 identifies raw data that correspond to common attributes in the demand first party training data for adding as new rows of data from the supply training data.

In an example of adding new columns of data, given that the training data may already include columns of data (e.g., for a fraudulent transaction(s)) corresponding to a merchant type, time of transaction, card type, country where the transaction occurred, and fraud flag (e.g., indicating whether the transaction was fraudulent or not), in some examples, a set of additional columns may include data for the merchant (e.g., facts about the merchant such as number of employees, social network profiles, when the merchant started being in business, amount of funding, and the like), person associated with credit card, or any other information related to the transaction.

Candidate feature mapper 408 maps features (e.g., data) detected by common feature detector 406. In an embodiment, candidate feature mapper 408 stores the common features into virtual feature catalog 412.

In an example, sub-industry standard schema of common fields 410 includes information related to common features (e.g., data) in various sub-industries (e.g., retail, automotive, insurance, banking, and the like), which candidate feature mapper 408 can utilize to map common features to training data utilized by ML models in the ML modeling portion of computing environment 400 in a more efficient manner.

A feature search and reduce component 414 may perform additional operations on the data from virtual feature catalog 412 to locate and reduce an amount of data prior to sending such data to an automated machine learning privacy protected trainer shown as AutoML privacy protected trainer 418. As further shown, baseline model 440 corresponds to an initial model that has been trained by standard ML trainer 438, which only uses first party training and testing data 436 to generate baseline model 440 (e.g., where such a model has not been trained using any additional row or additional column of data from one or more of database 402-1, database 402-2, or database 402-N).

As also shown, a common feature detector 416 is similar to common feature detector 406 from the datasets portion of computing environment 400. Common feature detector 416 receives first party training and testing data 436, identifies common features, which is then provided to AutoML privacy protected trainer 418.

In an embodiment, privacy protected trainer 418 uses data from feature search and reduce component 414 and common feature detector 416 to train boosted model 442. In the example of FIG. 4, boosted model 442 can represent an improved model from baseline model 440 as boosted model 442 incorporates additional data (e.g., additional row(s) or additional column(s) as discussed before while the baseline model 440 only uses demand first party training/testing data). In an example, the improved model corresponding to boosted model 442 advantageously is trained using such additional data which improves at least an accuracy score of the model, resulting in an improved In an example, ML scoring component 420 uses first party testing data 444 to determine a baseline accuracy score 422 for baseline model 440. Similarly, ML scoring component 420 uses first party testing data 444 to determine a boosted accuracy score 424 for boosted model 442.

As further shown, ML scoring component 420 performs a percentage boost calculation 428 that determines a percentage improvement in model accuracy between boosted model 442 and baseline model 440. In an implementation, percentage boost calculation 428 is based on a set of operations 425 using an area under the curve (AUC) where a difference between a first AUC for the boosted model 442 and a second AUC for the baseline model 440 is then divided by the second AUC for the baseline model 440. Alternatively or conjunctively, other types of techniques can be implemented to determine percentage boost calculation 428.

ML scoring component 420 uses boosted model 442 to perform machine learning operations including, for example, providing a prediction(s) in accordance with the configuration of boosted model 442, and is outputted as a set of predictions 426.

A boost pricing model 432 can be utilized to determine a boost bill 434, which is then sent to a recipient supplier customer on the left-hand side of computing environment 400. In an example, boost bill 434 is determined based on a count of rows scored and/or the portion of the boost contributed by the additional data that is inputted into boost pricing model 432. Additional discussion of billing and approaches for billing supplier customers are not described herein for the sake of clarity in describing the technical aspects of the subject system.

In an embodiment, AutoML privacy protected trainer 418 determines a set of columns to utilize from data received from feature search and reduce component 414. AutoML privacy protected trainer 418 also determines a set of transformations to perform on the set of columns. Further, AutoML privacy protected trainer 418 determines a set of hyperparameters in order to train a given boosted ML model.

In an embodiment, AutoML privacy protected trainer 418 can be implemented using various ML techniques including using an XGBoost (eXtreme Gradient Boosting) trainer that receives data and determines a first set of columns that can be beneficial (and similarly a set of other columns that are not beneficial) to the given boosted ML model, and based on a set of hyperparameters then selects a second set of columns from the first set of columns for using to train the boosted ML model.

It is appreciated that with respect to privacy of data utilized by AutoML privacy protected trainer 418, the subject system is enabled to protect the privacy of this data at least because other components (e.g., end users or demand customers) on the right-hand side of the ML modeling portion of computing environment 400 receive a trained ML model and none of the data from any of the data suppliers from the datasets portion of computing environment 400 on the left-hand side.

In an embodiment, a further abstraction layer would separate any end-user from directly accessing a given boosted ML model. In particular, the subject system could provide, in an implementation, a stored procedure call via network-based database system 102 that would provide access to various functionality (e.g., performing a prediction, and the like) of the boosted ML model.

As further shown, explain component 430 provides mechanisms to enable explaining individual predictions for classifiers that act on tables using "lime" (local interpretable model-agnostic explanations). In another example, explain component 430 can be used to indicate whether a given boosted ML model has unwanted bias in providing a prediction(s). Some examples of bias include background bias, perceptive bias, outcome bias, or availability bias.

As more incoming data is received, such new data is stored in database 450 which can then be provided to boosted model 442 to perform additional predictions on the new data.

A set of feature gap filler models 446 can be utilized to predict missing values in the data from virtual feature catalog 412 where such missing values are provided to a concatenator component 448 which then appends or combines the missing values with first party testing data 444 for use by ML scoring component 420. In an example, at inference time, ML scoring component runs both boosted model 442 and feature gap filler models 446 to perform a prediction task(s).

FIG. 5 is a flow diagram illustrating operations of a database system or components of computing environment 400 in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102 or components of computing environment 400, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102 or computing environment 400.

At operation 502, common feature detector 416 receives first party training data provided by an end-user of a baseline machine learning model.

At operation 504, common feature detector 416 determines a first set of common features based on the first party training data.

At operation 506, common feature detector 406 receives, from at least one data source, a set of datasets comprising raw data from an external data supplier different from the end-user.

At operation 508, common feature detector 406 determines a second set of common features based on the set of datasets.

At operation 510, AutoML privacy protected trainer 418 trains, using the first set of common features and the second set of common features, a second machine learning model, the second machine learning model incorporating additional training data from the external data supplier during training compared to the baseline machine learning model.

At operation 512, AutoML privacy protected trainer 418 generates a boosted machine learning model based at least in part on the training, the boosted machine learning model comprising the trained second machine learning model.

In an embodiment, the end-user of the baseline machine learning model is an entity or particular user performing machine learning development using a database system, and the entity or the particular user is separate from the external data supplier that is associated with a different entity.

In an embodiment, determining the first set of common features and determining the second set of common features are based on a sub-industry standard schema of common fields, or based on determining a set of columns or a set of rows that are included in the first party training data and the set of datasets.

In an embodiment, the second set of common features is appended to the first set of common features as a set of additional rows of data or a set of additional columns of data.

FIG. 6 is a flow diagram illustrating operations of a database system or components of computing environment 400 in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102 or components of computing environment 400, such as components of the compute service manager 108 or a node in the execution platform 110. Accordingly, the method 600 is described below, by way of example with reference thereto. However, it shall be appreciated that the method 600 may be deployed on various other hardware configurations and is not intended to be limited to deployment within the network-based database system 102 or computing environment 400.

At operation 602, ML scoring component 420 performs, using the baseline machine learning model, a first set of predictions using first party testing data.

At operation 604, ML scoring component 420 evaluates the first set of predictions based at least in part on a first comparison with the first party testing data.

At operation 606, ML scoring component 420 determines a first accuracy score based at least in part on the evaluating.

At operation 608, ML scoring component 420 performs, using the boosted machine learning model, a second set of predictions using the first party testing data.

At operation 610, ML scoring component 420 evaluates the second set of predictions based at least in part on a second comparison with the first party testing data.

At operation 612, ML scoring component 420 determines a second accuracy score based at least in part on the evaluating. In an embodiment, the second accuracy score is greater than the first accuracy score.

At operation 614, ML scoring component 420 determines a percentage boost value based at least in part on a first area under a curve of the first set of predictions and a second area under a curve of the second set of predictions.

At operation 616, ML scoring component 420 provides the percentage boost value to a boost pricing model to generate, using at least the percentage boost value and a number of rows scored, a value indicating a cost of utilizing the boosted machine learning model.

FIG. 7 is a flow diagram illustrating operations of a database system or components of computing environment 400 in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102 or components of computing environment 400, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102 or computing environment 400.

At operation 702, AutoML privacy protected trainer 418 receives, after generating the boosted machine learning model, a set of additional testing data, the set of additional testing data including a particular set of features corresponding to new testing data.

At operation 704, AutoML privacy protected trainer 418 determines a set of other features missing from the particular set of features, the set of other features being included in the first set of common features or the second set of common features.

At operation 706, AutoML privacy protected trainer 418 generates, using a set of feature gap filler models, a set of values corresponding to the set of other features.

At operation 708, concatenator component 448 performs a concatenation operation to include the set of values in the first party testing data.

In an embodiment, performing, using the boosted machine learning model, the second set of predictions is based on the first party testing data including the set of values.

Figure 8:
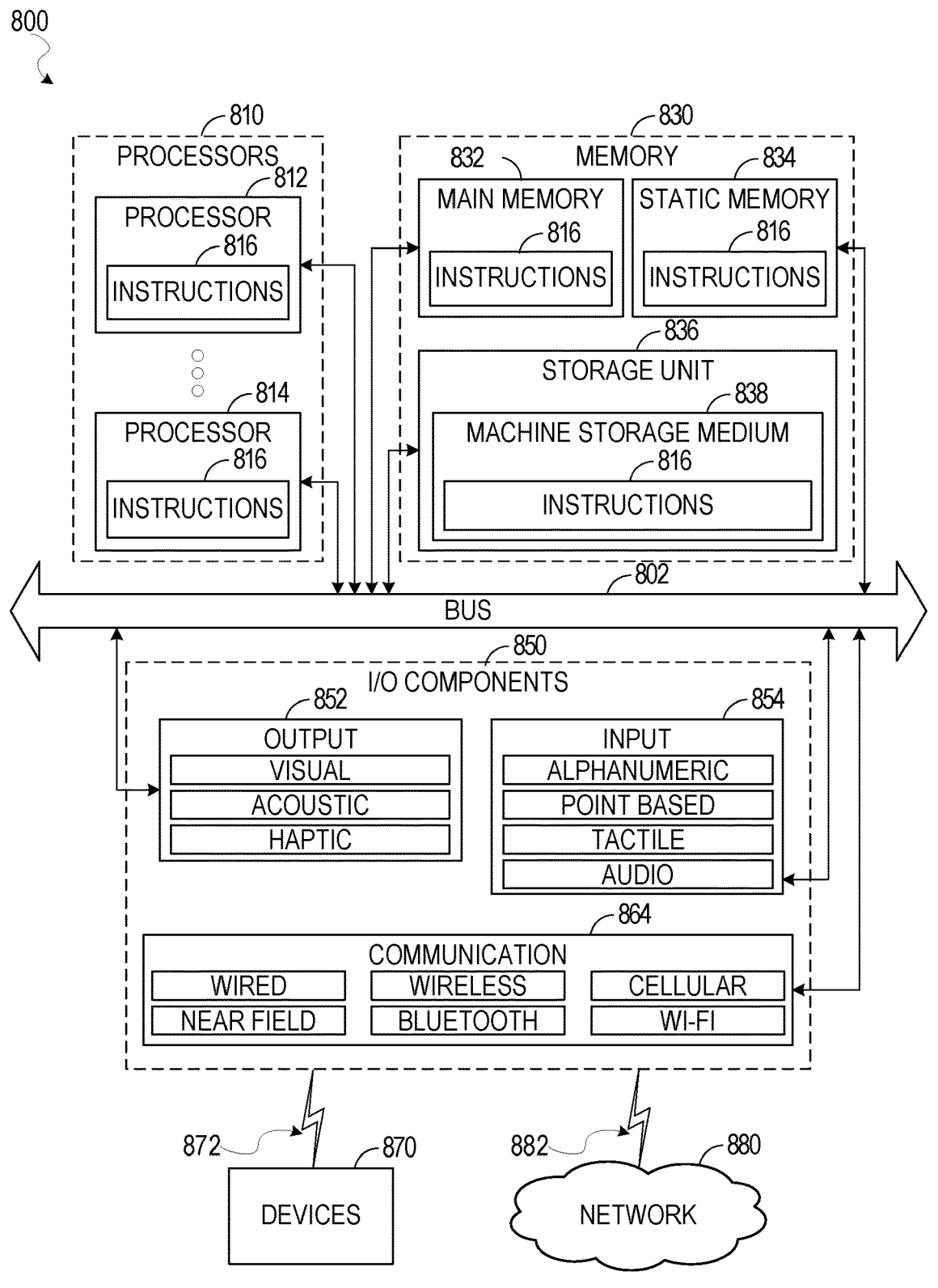
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the methods described above. As another example, the instructions 816 may cause the machine 800 to implement portions of the data flows illustrated in at least FIG. 5 or FIG. 8. In this way, the instructions 816 transform a general, non-programmed machine into a particular machine 800 (e.g., the compute service manager 88 or a node in the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 88 or the execution platform 110, and the devices 870 may include the client device 114 or any other computing device described herein as being in communication with the network-based database system 82 or the cloud storage platform 84-1.

Executable Instructions and Machine Storage Medium

The various memories (e.g., 830, 832, 834, and/or memory of the processor(s) 810 and/or the storage unit 836)

may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. The performance of certain of the operations may be distributed among the one or more processors, not only residing within a single machine, but also deployed across a number of machines. In some embodiments, the processor or processors may be located in a single location (e.g., within a home environment, an office environment, or a server farm), while in other embodiments the processors may be distributed across a number of locations.

Conclusion

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
a memory storing instructions that cause the at least one hardware processor to perform operations comprising:
receiving first party training data provided by an end-user of a baseline machine learning model;
determining a first set of common features based on the first party training data;
receiving, from at least one data source, a set of datasets comprising raw data from an external data supplier different from the end-user;
determining a second set of common features based on the set of datasets;
training, using the first set of common features and the second set of common features, a second machine learning model, the second machine learning model incorporating additional training data from the external data supplier during training compared to the baseline machine learning model;
generating a boosted machine learning model based at least in part on the training, the boosted machine learning model comprising the trained second machine learning model;
performing, using the baseline machine learning model, a first set of predictions using first party testing data;
evaluating the first set of predictions based at least in part on a first comparison with the first party testing data;
determining a first accuracy score based at least in part on the evaluating;
performing, using the boosted machine learning model, a second set of predictions using the first party testing data;
evaluating the second set of predictions based at least in part on a second comparison with the first party testing data;
determining a second accuracy score based at least in part on the evaluating;

determining a percentage boost value based at least in part on a first area under a curve of the first set of predictions and a second area under a curve of the second set of predictions; and
providing the percentage boost value to a boost pricing model to generate, using at least the percentage boost value and a number of rows scored, a value indicating a cost of utilizing the boosted machine learning model.

2. The system of claim 1, wherein the second accuracy score is greater than the first accuracy score.

3. The system of claim 1, wherein the operations further comprise:
receiving, after generating the boosted machine learning model, a set of additional testing data, the set of additional testing data including a particular set of features corresponding to new testing data;
determining a set of other features missing from the particular set of features, the set of other features being included in the first set of common features or the second set of common features;
generating, using a set of feature gap filler models, a set of values corresponding to the set of other features; and
performing a concatenation operation to include the set of values in the first party testing data.

4. The system of claim 3, wherein performing, using the boosted machine learning model, the second set of predictions is based on the first party testing data including the set of values.

5. The system of claim 1, wherein the end-user of the baseline machine learning model comprises an entity or particular user performing machine learning development using a database system, the entity or the particular user being separate from the external data supplier that is associated with a different entity.

6. The system of claim 5, wherein determining the first set of common features and determining the second set of common features are based on a sub-industry standard schema of common fields, or based on determining a set of columns or a set of rows that are included in the first party training data and the set of datasets.

7. The system of claim 1, wherein the second set of common features is appended to the first set of common features as a set of additional rows of data or a set of additional columns of data.

8. A method comprising:
receiving first party training data provided by an end-user of a baseline machine learning model;
determining a first set of common features based on the first party training data;
receiving, from at least one data source, a set of datasets comprising raw data from an external data supplier different from the end-user;
determining a second set of common features based on the set of datasets;
training, using the first set of common features and the second set of common features, a second machine learning model, the second machine learning model incorporating additional training data from the external data supplier during training compared to the baseline machine learning model;
generating a boosted machine learning model based at least in part on the training, the boosted machine learning model comprising the trained second machine learning model;
performing, using the baseline machine learning model, a first set of predictions using first party testing data;

evaluating the first set of predictions based at least in part on a first comparison with the first party testing data;

determining a first accuracy score based at least in part on the evaluating;

performing, using the boosted machine learning model, a second set of predictions using the first party testing data;

evaluating the second set of predictions based at least in part on a second comparison with the first party testing data;

determining a second accuracy score based at least in part on the evaluating;

determining a percentage boost value based at least in part on a first area under a curve of the first set of predictions and a second area under a curve of the second set of predictions; and providing the percentage boost value to a boost pricing model to generate, using at least the percentage boost value and a number of rows scored, a value indicating a cost of utilizing the boosted machine learning model.

9. The method of claim 8, wherein the second accuracy score is greater than the first accuracy score.

10. The method of claim 8, further comprising:

receiving, after generating the boosted machine learning model, a set of additional testing data, the set of additional testing data including a particular set of features corresponding to new testing data;

determining a set of other features missing from the particular set of features, the set of other features being included in the first set of common features or the second set of common features;

generating, using a set of feature gap filler models, a set of values corresponding to the set of other features; and performing a concatenation operation to include the set of values in the first party testing data.

11. The method of claim 10, wherein performing, using the boosted machine learning model, the second set of predictions is based on the first party testing data including the set of values.

12. The method of claim 8, wherein the end-user of the baseline machine learning model comprises an entity or particular user performing machine learning development using a database system, the entity or the particular user being separate from the external data supplier that is associated with a different entity.

13. The method of claim 12, wherein determining the first set of common features and determining the second set of common features are based on a sub-industry standard schema of common fields, or based on determining a set of columns or a set of rows that are included in the first party training data and the set of datasets.

14. A non-transitory computer-storage medium comprising instructions that, when executed by one or more processors of a machine, configure the machine to perform operations comprising:

receiving first party training data provided by an end-user of a baseline machine learning model;

determining a first set of common features based on the first party training data;

receiving, from at least one data source, a set of datasets comprising raw data from an external data supplier different from the end-user;

determining a second set of common features based on the set of datasets;

training, using the first set of common features and the second set of common features, a second machine learning model, the second machine learning model incorporating additional training data from the external data supplier during training compared to the baseline machine learning model;

generating a boosted machine learning model based at least in part on the training, the boosted machine learning model comprising the trained second machine learning model;

performing, using the baseline machine learning model, a first set of predictions using first party testing data;

evaluating the first set of predictions based at least in part on a first comparison with the first party testing data;

determining a first accuracy score based at least in part on the evaluating;

performing, using the boosted machine learning model, a second set of predictions using the first party testing data;

evaluating the second set of predictions based at least in part on a second comparison with the first party testing data;

determining a second accuracy score based at least in part on the evaluating;

determining a percentage boost value based at least in part on a first area under a curve of the first set of predictions and a second area under a curve of the second set of predictions; and providing the percentage boost value to a boost pricing model to generate, using at least the percentage boost value and a number of rows scored, a value indicating a cost of utilizing the boosted machine learning model.

* * * * *